United States Patent [19]
Di Veto

[11] 3,985,983
[45] Oct. 12, 1976

[54] SWITCH CONTROL APPARATUS FOR RIBBON TENSIONING SYSTEMS

[75] Inventor: Hilliard R. Di Veto, Plymouth, Mich.

[73] Assignee: Burroughs Corporation, Detroit, Mich.

[22] Filed: Jan. 17, 1975

[21] Appl. No.: 542,060

Related U.S. Application Data

[63] Continuation-in-part of Ser. No. 464,736, April 29, 1974, abandoned.

[52] U.S. Cl............................. 200/61.18; 242/75.43; 242/67.3 R; 335/236
[51] Int. Cl.²........................................ B65H 25/14
[58] Field of Search............... 200/61.13–61.18, 200/61.39–61.42, 61.45 M; 335/205–207, 236, 237; 242/75.43, 67.3 R, 193

[56] References Cited
UNITED STATES PATENTS

| | | | |
|---|---|---|---|
| 3,246,526 | 4/1966 | Dollheimer et al. | 200/61.41 X |
| 3,426,976 | 2/1969 | Maxey | 242/75.43 X |
| 3,541,277 | 11/1970 | Miller et al. | 200/61.13 |
| 3,741,054 | 6/1973 | Alperin et al. | 200/61.13 X |
| 3,797,773 | 3/1974 | Berry | 242/75.43 |

*Primary Examiner*—James R. Scott
*Attorney, Agent, or Firm*—Charles Paul Padgett, Jr.; Leon E. Redman; Carl Fissell, Jr.

[57] ABSTRACT

A tension control system employing a shunt-positioning slide provided with a longitudinal slot engaged by a pin carried by a tension-responsive actuating slide member only when predetermined upper and lower tension thresholds are exceeded to insert and withdraw a shunt member from a position between a magnet and a reed switch which deactivates and activates a rewind motor while preventing undesirable recycling of the reed switch and rewind motor.

16 Claims, 5 Drawing Figures

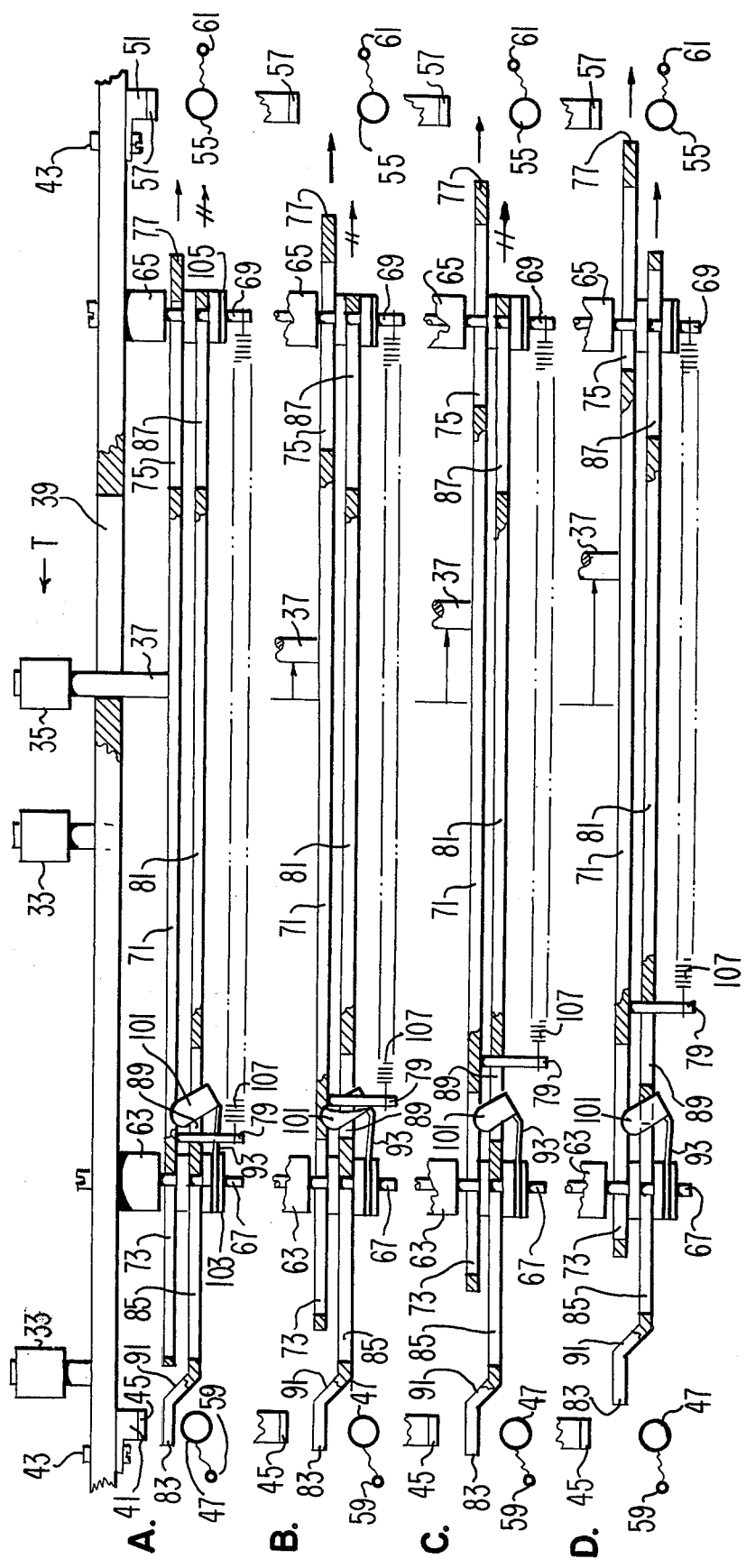

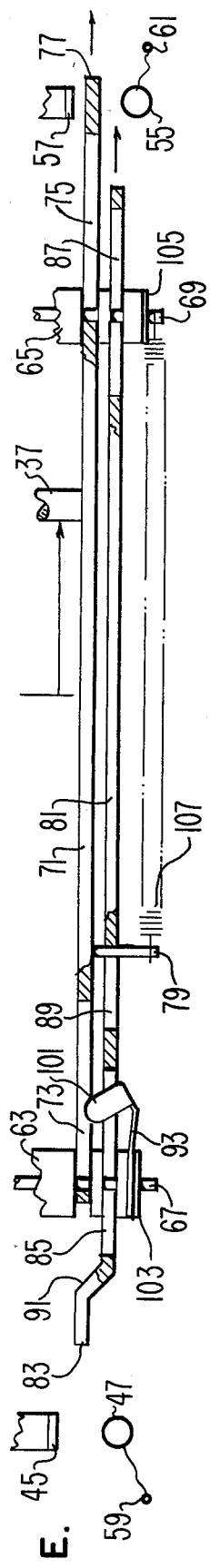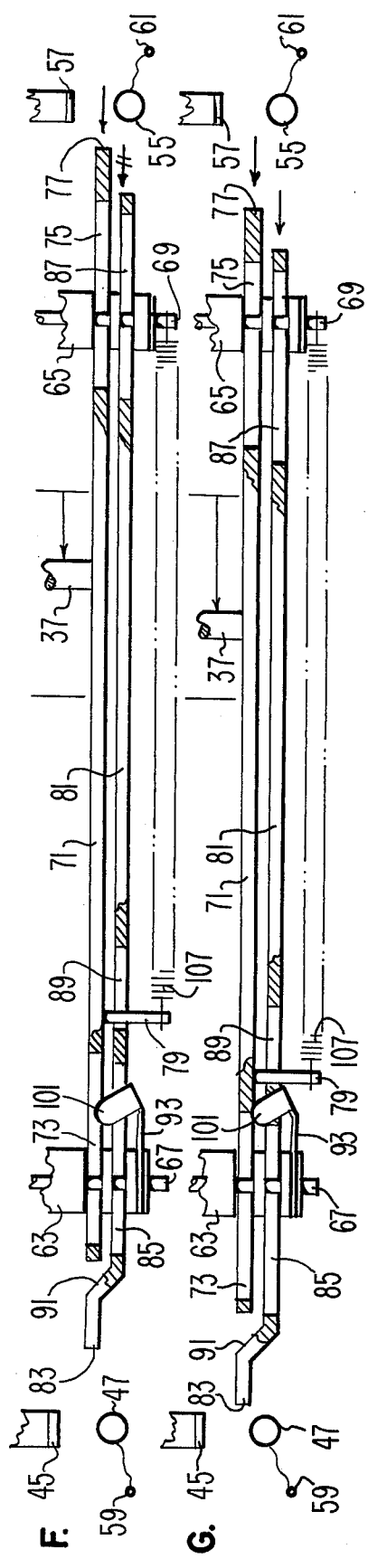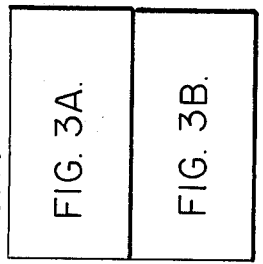

3,985,983

SWITCH CONTROL APPARATUS FOR RIBBON TENSIONING SYSTEMS

REFERENCE TO RELATED APPLICATIONS

This is a continuation-in-part of application Ser. No. 464,736 which was filed on Apr. 29, 1974 by the present inventor and which is now abandoned. This application is also related to U.S. Pat. No. 3,797,773 which issued on Mar. 19, 1974 to Jack Beery for "Maintaining Ribbon Tension With Tapered-Shunt Reed Switch Control Apparatus" and which is assigned to the assignee of the present invention. This patent discloses a system for unwinding a rewinding ribbon-like media on a take-up spool while maintaining substantially constant tension in the ribbon-like member by the intermittent operation of a rewind motor which is controlled by a tapered shunt reed switch responsive to the tension in the ribbon-like medium, and this patent is incorporated by reference herein.

BACKGROUND OF THE INVENTION

This invention relates generally to a system for unwinding and rewinding a ribbon-like rewind medium and more particularly to such a system wherein the tension in the rewind medium is maintained substantially constant by intermittently driving a take-up spool by the actuation and deactuation of a rewind motor.

When a rewind medium is fed at a first rate to a take-up spool which is operated at a different or intermittent rate, there are, of course, repeated variations in the ribbon tension. These variations may result in tangling, stretching or breaking the rewind medium. When the rewind medium has a magnetic oxide coating or an ink coating or the like, such as are used in the tape recording or printing arts, excess stretching of the rewind media can cause fragments of the oxide coating or ink coating to break off thereby rendering corresponding portions of the rewind medium useless. Prior art solutions to these problems generally provide apparatus designed to maintain the torque developed by the take-up spool drive motor within specific narrow limits that will not damage the rewind medium.

Such prior art solutions have utilized either complex circuitry to provide the rapidly responsive takeup spool motor control that is required to restrict the torque within these narrow limits, or more modest circuitry which results in a higher cyclic rate of take-up spool operation.

The use of complex electrical circuitry greatly increases the cost of the system and makes maintenance and diagnostic functions more difficult. The use of the more modes circuitry with the high cyclic rate of operation usually results in shorter component life.

A few of the systems which employ modest circuitry and have a higher cyclic rate of take-up spool operation use a reed switch to control the operation of the rewind motor. The reed switch is positioned in proximity to a magnetic member and a shunt plate is positioned between the reed switch and the magnetic member. So long as the shunt plate is positioned between the reed switch and the magnetic member, the switch remains deactivated and the rewind motor remains off. A few of these systems employ a shunt-positioning member which is directly responsive to the tension in the rewind medium for controlling the positioning of the shunt plate such that a lessening in tension causes the shunt plate to withdraw from a shunt position disposed between the reed switch and the magnetic member thereby causing the reed switch to become actuated and the rewind motor to operate to take up the slack. When the tension is increased, the tension-responsive shunt-positioning means will reinsert the shunt plate between the reed switch and the magnetic member thereby deactivating the switch and shutting off the rewind motor.

The problem with such systems is that the tension-responsive members tend to respond to slight reductions or variations in the tension of the rewind media thereby causing the reed switch to be continually turning off and on so as to cause the rewind motor to operate in a large number of short spurts. This in turn tends to cause "cinching" or excessive tightness in the rewind media which, in addition to wasting energy and causing excessive wear on the motor and associated rewind mechanisms, has the effect in many cases of causing the take-up reel to buckle or bind.

SUMMARY OF THE INVENTION

It is an object of this invention to provide a system for unwinding and rewinding a ribbon-like medium without any of the above-cited problems.

It is another object of the present invention to provide a tension-responsive system which extends the period of the rewind motor's on and off times so as to prevent damage to the motor, the associated rewind apparatus, or the rewind medium.

It is yet another object of the present invention to provide an improved-rewind medium take-up system which is responsive to the tension in the rewind medium for controlling the operation of a rewind motor and insuring a substantially constant tension in the rewind media within predetermined limits.

It is still a further object of the present invention to provide an improved tension control system wherein a switch-operated rewind motor controls the tension in a rewind medium in response to a tension-sensitive shunt-positioning member which controls the actuation and deactuation of the switch in response to predetermined overall increases and decreases in the tension of the rewind medium while ignoring insignificant tension variations that would otherwise cause undesirable recycling of the rewind motor.

It is yet a further object of the present invention to provide an improved tension-responsive switch actuating mechanism which is responsive to a first predetermined tension for urging a shunt-positioning means to position a magnetic shunt between a magnetic means and a reed switch, which is responsive to a second predetermined and different tension in the medium for urging the shunt-positioning means to position the magnetic shunt away from between the magnetic means and the reed switch, and which is responsive to any degree of tension between the first predetermined tension and the second predetermined tension for maintaining the shunt-positioning means in its current position.

These and other objects and advantages of the present invention are accomplished in a system wherein the actuation and deactuation of a reed switch is used to control the operation of a rewind motor which is operative to increase the tension in a rewind medium. The actuation and deactuation of the reed switch is accomplished by positioning a magnetic shunt between a magnet and the reed switch. The magnetic shunt is positioned by a shunt-positioning member which is moved toward or away from the reed switch assembly by a tension-responsive slide member. The slide member is responsive to a first predetermined tension in a rewind medium for urging the shunt-positioning means to position the magnetic shunt between the magnet and the reed switch, and responsive to a second predetermined and lesser tension in the rewind medium for urging the shunt-positioning means to position the magnetic shunt away from between the magnet and the reed switch, and is responsive to any degree of tension between said first predetermined tension in said rewind medium and said second predetermined lesser tension in said rewind medium for maintaining the shunt-positioning means in its present position thereby providing for a lag period which allows for a predetermined amount of variation in the tension in said rewind medium without causing switch actuation or deactuation.

BRIEF DESCRIPTION OF THE DRAWINGS

Other objects, advantages and features of this invention will become more fully apparent from the following detailed description, appended claims, and accompanying drawings in which like reference numerals designate corresponding parts:

FIG. 3A–G represents a series of side elevation views of the tension-responsive switch actuator mechanism of the present invention showing various positions of the shunt-positioning member and the tension-responsive slide member for varying degrees of tension in the rewind medium.

DETAILED DESCRIPTION OF THE INVENTION

Figure 1:
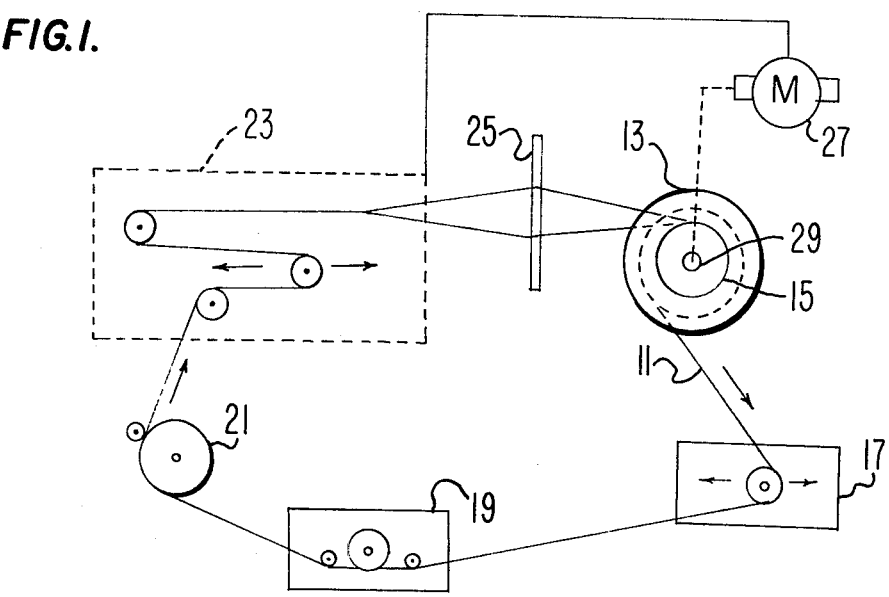
FIG. 1 shows a representative of a ribbon transport system which incorporates the present invention.

FIG. 1 illustrates a rewind transport system which incorporates the present invention. The rewind medium may be any type of web, strand, tape or ribbon-like member such as a magnetic ink ribbon, and ink ribbon, paper tape, magnetic tape or the like. The rewind medium 11 follows a path from a supply spool 13 through various drive and utilization apparatus to a take-up spool 15. The rewind medium 11 is assumed to follow a clockwise path from the supply spool 13 through a supply tension control apparatus 17, past a utilization device 19 which may be a printing station, read station, punch station or the like, past a drive wheel or roller 21, through a take-up tension control system 23, and over a level changer to take-up spool 15. As the drive wheel or driver roller 21 pulls the ribbon from the supply spool 13 through the utilization device 19, it simultaneously supplies the used medium to be rewound to the take-up tension control system of block 23. The tension control system of block 23 responds to the tension in the rewind medium for controlling the operation of a rewind motor 27 which is intermittently driven in response to a lessening in the tension in the rewind medium for driving the take-up spool 15 to restore the tension in the used rewind medium.

The medium supply tension control apparatus 17 is known in the art and may be, for example, the ribbon supply tension apparatus of U.S. Pat. No. 3,797,773. Similarly, the supply spool 13 and the take-up spool 15 may be arranged so that the rewind motor 27 intermittently drives shaft 29 to control the take-up spool 15 which is locked into position on the shaft 29 whereas the supply spool 13 may be secured to a freely rotatable sleeve which is disposed about the shaft 29. The spool apparatus and the operation thereof as well as the structure and operation of the level changer 25 may be, for example, substantially as shown in the above-referenced patent.

Figure 2:
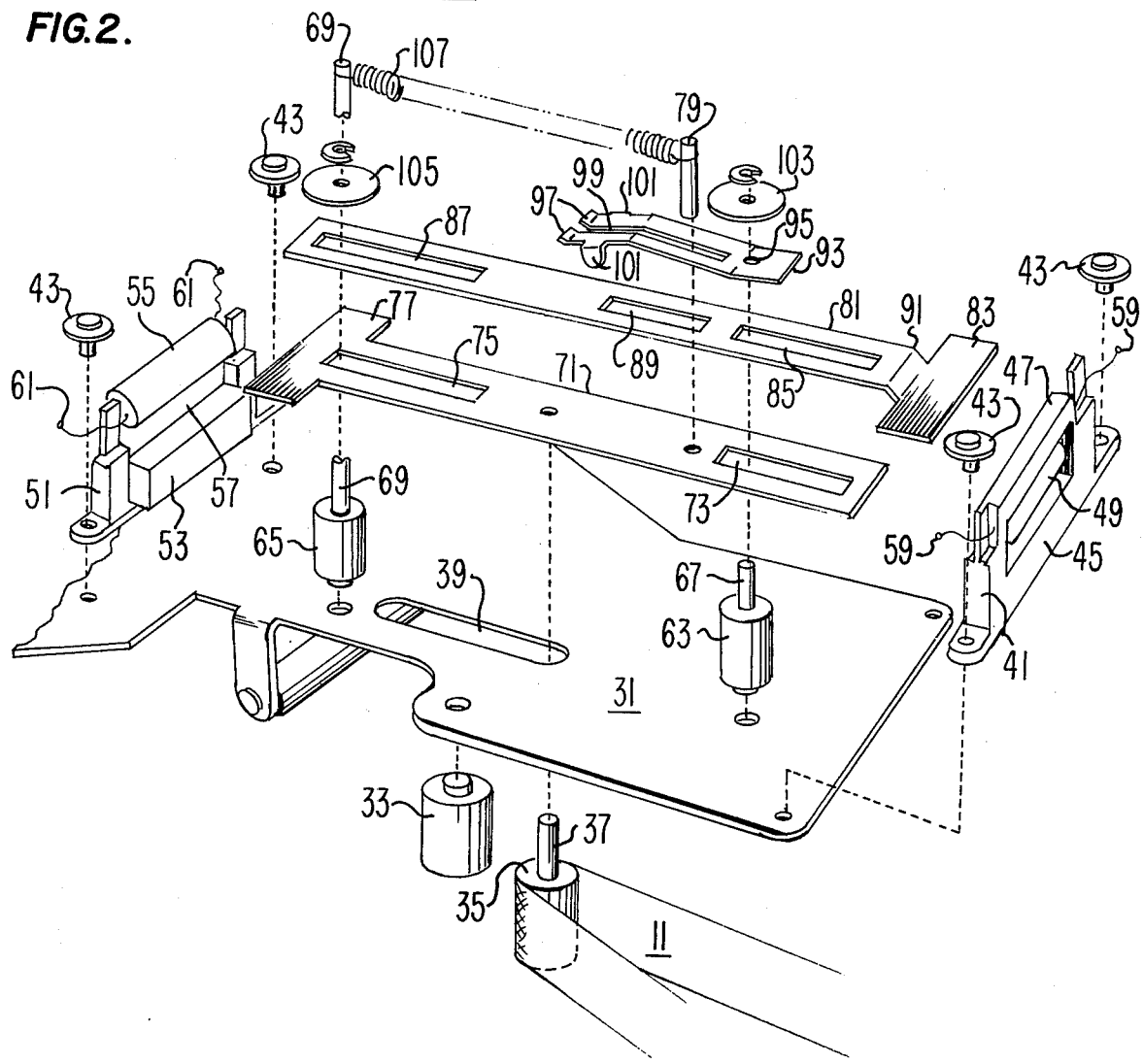
FIG. 2 is an exploded perspective view of the tension-responsive switch actuator mechanism of the present invention.

FIG. 2 is an exploded view of the preferred embodiment of the tension-responsive switch actuator mechanism of the present invention which is used to control the tension in the rewind medium 11 by controlling the intermittent operation of the rewind motor 27. A support means or frame 31 has a pair of rollers 33, only one of which is shown in FIG. 2 but both of which are visible in FIG. 3A, mounted on one side thereof. A tension-responsive roller 35 is also positioned on the same side of the frame 31 and a shaft member 37 about which the tension-responsive roller 35 is free to rotate extends through a longitudinal slot 39 in the frame 31. The rewind media 11 is positioned about the rollers as shown in FIG. 1, with the tension-responsive roller 35, (FIGS. 2 and 3) corresponding to the intermediate roller in block 23 which has the pair of arrows drawn to show that it moves back and forth in response to the tension exerted thereon by the rewind medium 11.

On the opposite side of the frame 31 and at one end thereof, a switching assembly 41 is mounted by means of pins 43 or similar securing means. The switch assembly includes a bar magnet 45 or similar source of magnetic flux and a reed switching element 47 which is spaced apart from the magnet by an elongated shunt-receiving opening 49. A second switching assembly 51 is positioned a spaced distance away from the switching assembly 41 and fastened to the frame 31 by similar securing means 43. The switching assembly 51 is identical to the switching assembly 41 and includes a bar magnet 53, a reed switch 55 and a shunt-receiving opening 57 between the reed switch 55 and the bar magnet 53. The opening 49 and 57 are aligned with one another as shown in the drawings.

The reed switch element 47 is equipped with a pair of electrical leads 59 which may be connected to any type of circuit, known in the art, for controlling the operation of the rewind motor 27 of FIG. 1. Similarly, the reed switch 55 is provided with a pair of electrical leads 61 which can be coupled to an error indication circuit or system shut-down circuit as described hereinafter.

First and second spacing rollers 63 and 65 respectively are rigidly fastened to the surface of frame 31 by any of the means known in the art. The spacing rollers are aligned with one another and positioned along a center line which extends between the centers of the openings 49 and 57. A first vertically extending guide pin 67, which may be part of the means by which the spacing roller 63 is attached to the frame 31, extends vertically upward from the spacing roller 63 and a second vertically extending guide pin 69 extends vertically upward from the spacing roller 65. The shaft member 37 extends through the elongated slot 39, which is also aligned between the support rollers 63 and 65, and is rigidly secured to the bottom of a T-shaped tension-responsive slide member 71. The slide member 71 is provided with a first longitudinal slot 73 at the end thereof which is closest to the switch assembly 41 and with a second longitudinal slot 75 which is located at the opposite end and which is closest to the switching assembly 51. The cross bar portion of the T comprises a shunt plate 77 which is adapted for positioning within the opening 57 between the reed switch 55 and the bar magnet 53 such that when the shunt plate 77 is positioned within the opening 57, it diverts the magnetic flux from the bar magnetic 53 so that the reed switch 55 is deactuated and when shunt plate 77 is removed from the opening 57, the reed switch 55 responds to the magnetic flux and is activated. The sliding member 71 further includes a vertically extending pin 79 which is secured to the sliding member at a point between the elongated slot 73 and the elongated slot 75 but closer to the slot 73.

A T-shaped shunt-positioning member 81 is situated above the slide member 71 and the cross portion of the T comprises a magnetic shunt plate 83 which is adapted for positioning within the slot 49 such that the reed switch 47 is deactuated when the shunt plate 83 is positioned within the opening 49 and is deactuated when the shunt plate 83 is removed from the opening 49. The body portion of the shunt-positioning element 81 includes a first longitudinal slot 85 located at the end of the body portion of the shunt-positioning member 81 which is closest to the shunt plate 83 and which is positioned over the longitudinal slot 73 and a second longitudinal slot 87 which is located at the opposite end of the body portion of the shunt-positioning member 81 and which is positioned over the slot 75 of the sliding member. 71. A third longitudinal slot 89 is positioned between the longitudinal slot 85 and the longitudinal slot 87 and is aligned therewith. The third longitudinal slot 89 is positioned a relatively short distance behind the first longitudinal slot 85. The shunt-positioning member also includes a neck portion 91 which connects the body portion of the shunt-positioning member 81 with the magnetic shunt plate 83 and which is bent at an angle so as to position the shunt plate 83 in the same plane as the shunt plate 77 so that the slots 49 and 57 are substantially the same distance above the frame 31.

The vertically extending pin 79, which has one end attached to the sliding member 71 for movement therewith, has a body portion which extends through the third longitudinal slot 89 for reciprocal movement therein and an opposite end which extends thereabove. The guide pin 67 extends through the longitudinal slots 73 and 85 and the guide pin 69 extends through the longitudinal slots 75 and 87 for insuring that the motion of the slide member 71 and the motion of the shunt-positioning member 81 is restricted to a longitudinal path between the openings 49 and 57 such that only reciprocal movement along this longitudinal path is possible. A clip member 93 has an attachment portion which is provided with a hole 95 which receives guide pin 67 and a pair of springlike arms 97 with a longitudinal slot 99 therebetween. The longitudinal slot has one end closed where the bifurcated arms 67 originated near the end of the clip which contains the opening 95 and the other end of the longitudinal slot is completely open. Each of the spring-like arms 97 is equipped with a tongue-like portion 101 which extends vertically downward therefrom and further serves to position the shunt-positioning member 81 in slidable relationship to the slide member 71 such that they can move longitudinally with respect to one another. Fastening means 103 is fastened to the portion of the guide pin 67 which extends through the slots 73 and 85 and through the opening 95 in the clip 93 to maintain them in a slidable relationship to one another. A similar fastening means 105 is secured to the upper portion of the guide pin 69 which extends through the longitudinal slots 75 and 87.

A biasing spring 107 is connected between the top of the guide pin 69 which extends above the fastening means 105 and the top of the pin 79.

In operation, the tension exerted on the tension-responsive roller 35 by the rewind medium 11 urges the shaft 37 toward the end of the longitudinal slot 39 nearest the switching assembly 41. Since the upper end of shaft 37 is rigidly attached to the slide member 71, it is likewise urged toward the switching assembly 41. The sliding element 71 is also subject to a force in the opposite direction since the spring member 107 tends to urge the slide member 71 away from the switching assembly 41 via pin 79. The pin 79 is the only means whereby motion may be imparted to the shunt-positioning member 81 and, as seen in FIG. 2, the pin is free to move from one end of the longitudinal slot 89 to the other without engaging the shunt-positioning member and imparting motion thereto. When normal tension is being maintained, the shaft 37 is positioned toward the end of the longitudinal slot 39 nearest the switching assembly 41 causing the slide member 71 to be positioned toward the switching assembly 41 such that the guide pins 67 and 69 are near the ends of the longitudinal slots 73 and 75 furthest from the switching assembly 41. In this position, the pin 79 had previously contacted the end of the slot 89 nearest the switching assembly 41, engaged the shunt-positioning member 81, and caused the shunt-positioning member to move toward the switching assembly 41 and position the magnetic shunt plate 83 within the opening 49 so as to deactuate the reed switch 47. As will be explained hereinafter, the slide member 71 will be able to respond to a lessening in the tension in said rewind medium 11 and move a predetermined distance away from the switching assembly before the pin 79 engages the opposite end of the slot 89 and engages the shunt-positioning member 81 for removing the magnetic shunt 83 from the opening 49. A similar result is obtained regardless of whether we are responding to an increase or a decrease in tension. It will be observed that the system does not respond to minor variations in tension and thereby prolongs the periods during which the rewind motor is actuated or deactuated so as to prolong the life of the motor and the associated apparatus.

The operation of the tension-responsive system of the present invention will now be described with reference to FIGS. 3A through 3G wherein the reference numerals correspond to those set forth in FIG. 2.

During normal operation, the rewind medium 11 would be wrapped about the rollers 33 and the tension-responsive roller 35 as illustrated in block 23 of FIG. 1. The tension in the rewind medium 11 would cause the roller 35 to be urged in the direction of the arrow labeled T for tension as shown in FIG. 3A. This force would be transmitted through the shaft 37 of the tension-responsive roller 35 and would urge the slide member 71 towards the left as shown in FIG. 3A. This is the normal position of the slide member 71 for desired system tension, and as illustrated in FIG. 3A, the pin 79 which is attached to slide member 71 has engaged the shunt-positioning member 81 at the end of the longitudinal slot 89 nearest the switch assembly 41 and moved the shunt-positioning member 81 so as to position the shunt plate 83 between the magnet 45 and the reed switch 47. With the shunt plate 83 in this position, the magnetic flux from the magnet 45 is shunted through the shunt plate 83 and the reed switch 47 remains deactivated.

When a slight lessening in the tension in the rewind medium occurs, the slide member 71 will be moved to the right in the direction of the arrow in FIG. 3B under the biasing force of the spring 107 which couples the fixed guide pin 69 to the vertical pin 79 of slide member 71. As the slide member 71 moves in a direction away from the magnet 45 and reed switch 47, the shunt-positioning member 81 remains stationary since the pin 79 is moving within the longitudinal slot 89 of the shunt-positioning member 81. As the tension is increased and decreased within this range, the pin 79 can move to right and to the left within the slot 89 and the shunt-positioning member 81 will only be moved when the pin 79 engages either end of the slot 89.

Assuming a further decrease in the tension in the rewind medium 11, spring 107 will move the pin 79 and the slide member 71 to a point at which it just engages the end of the slot 89 which is furthest from the magnet 45 and reed switch 47 as shown in FIG. 3C.

As the tension is further reduced, the spring 107 will urge the pin 79 and the slide 71 further to the right away from the magnet 45 and reed switch 47 but since the pin 79 had previously engaged the shunt-positioning member 81, the shunt-positioning member will be moved to the right so as to remove the shunt plate 83 from between the magnet 45 and the reed switch 47. Once the shunt plate 83 has been removed, the magnetic flux from magnet 45 will activate the reed switch 47, and the activation of reed switch 47 will cause the activation of the rewind motor 17 of FIG. 1 which rotates shaft 29 so as to cause the take-up spool 15 to take up the slack in the rewind medium 11 and restore the tension to the desired value. The position of the slide member 71 and the shunt-positioning member 81 for this situation are shown in FIG. 3D.

Under normal operating conditions, the rewind motor 27 will operate the take-up spool 15 and the tension will be increased. As the tension is increased, the shaft 37 of roller 35 will cause the slide member 71 to move once more to the left toward the magnet 45 and reed switch 47 as shown in FIG. 3F. Again, the shunt-positioning member 81 is not moved since the pin 79 is moving from the right-most end of slot 89 within the slot toward the left.

As tension is further increased, the shaft 37, will move the slide member 71 closer to the magnet 45 and reed switch 47 causing the pin 79 to contact the end of slot 89 which is closest to the magnet 45 and reed switch 47 such that further movement will cause the shunt-positioning member 81 to move the shunt plate 83 toward the magnet 45 and reed switch 47 as shown in FIG. 3G. The re-engagement of the pin 79 and the shunt positioning member 81 will occur when the pin 79 has traveled a predetermined distance (the length of the slot) from its position when it disengaged the right end of slot 89.

When the tension has been restored to its desired value, shaft 37 will have responded to the restored tension sensed by roller 35 and have caused the slide-positioning member 71 and pin 79 to have moved the shunt-positioning member 81 to the position shown in FIG. 3A wherein the shunt plate 83 is once more inserted between the bar magnet 45 and the reed switch 47 thereby deactivating the reed switch 47 and causing the rewind motor 27 of FIG. 1 to be shut off.

FIG. 3E indicates the operation of the mechanism of the present invention in a situation wherein all tension has been lost, such as may occur when the rewind mechanism fails or when a break in the rewind medium occurs. In this case the spring 107 has caused the pin 79 to move the slide member 71 until the shaft 35 engages the end of slot 39 of FIG. 1 closest to the switch assembly 51 and the shunt plate 77 of the slide member 71 has been inserted to a position between the bar magnet 57 and the reed switch 55. The insertion of the shunt plate 77 causes the reed switch 55 to deactuate, and the deactuation of reed switch 55 may be used to generate an error signal or cause the system to shut down, as known in the art.

It will, therefore, be observed that the tension-responsive switch actuation mechanism of the present invention is operative in either direction and insures that the system does not continually actuate and deactuate the switch in response to minor variations in tension but rather operates to prolong the time during which the motor is actuated and the time during which the motor is deactuated so as to prolong the life of the motor and prevent damage to the various rewind mechanisms. It will be readily apparent to those skilled in the art that the amount of variations and tension which can be tolerated can be adjusted by adjusting the length of longitudinal slot 79 and the strength of spring 107. For example, if the length of slot 89 were shortened, the mechanism would more quickly respond to lesser variations in tension and cause switch actuation and deactuation, whereas if slot 89 were lengthened, it would require far greater variations in tension before the switch condition was changed.

Although specific apparatus has been shown for the purpose of describing applicant's invention, it will be apparent to those skilled in the art that other variations and modifications in the specific structures illustrated may be made without departing from the spirit and scope of the invention which is limited only by the appended claims.

What is claimed is:

1. In a tension control system wherein a rewind motor is used to control the tension in a medium to be rewound and wherein a reed switch is actuated and deactuated to control the operation of the rewind motor by the removal or insertion of a shunt member at a shunt position disposed between the reed switch and a magnetic flux-generating means in response to the tension in said medium, the improvement comprising:

shunt-positioning means for positioning said shunt member in relation to said reed switch and said magnetic flux-generating means for controlling the actuation and deactuation of said reed switch; and tension-responsive actuating means responsive to a first predetermined normal tension in said medium for urging said shunt-positioning means to position and shunt member toward said shunt position disposed between said reed switch and said magnetic flux-generating means, said actuating means also responsive to a second predetermined minimum tension in said medium for urging said shunt-positioning means to position said shunt member away from said shunt position disposed between said reed switch and said magnetic flux-generating means; and means cooperating with both said shunt-positioning means and said actuating means for inhibiting movement of the shunt member in response to tension variations in said medium being intermediate said first predetermined normal tension and said second predetermined minimum tension thereby preventing undesirable recycling of said rewind motor by said reed switch for said intermediate tension variations.

2. The improved tension control system of claim 1 wherein said inhibiting means includes means for defining a dual-ended longitudinal slot aligned along the axis of motion of said shunt-positioning means; and means secured to said tension responsive actuating means for engaging one end of said dual-ended slot only when said tension-responsive actuating means responds to said first predetermined normal tension in said medium and the other end of said dual-ended slot when said tension-responsive actuating means responds to said second predetermined minimum tension in said medium.

3. The improved tension control system of claim 2 wherein said tension-responsive actuating means includes:

slide means adapted for reciprocal motion toward and away from said reed switch and said magnetic flux-generating means for controlling the positioning of said shunt-positioning means;

means responsive to the tension in said medium for urging said slide means toward said reed switch and said magnetic flux-generating means; and biasing means for resiliently biasing said slide means away from said reed switch and said magnetic flux-generating means and responsive to a decrease in the tension in said medium for moving said slide means away from said reed switch and said magnetic flux-generating means a distance proportional to said decrease in tension.

4. In a tension control system for maintaining a controlled tension in a medium by a tension adjustment device responsive to the output of a reed switch which is actuated by the removal of a shunt member from a shunt position disposed between the reed switch and a magnetic flux-generating means and deactuated upon the insertion of the shunt member between the reed switch and the magnetic flux-generating means, the improvement comprising:

a shunt-positioning slide for inserting said shunt member into said shunt position and removing said shunt from said shunt position;

an actuator slide responsive to the tension in the medium for reciprocal movement toward and away from the shunt position;

means for limiting the motion of both said shunt-positioning slide and said actuator slide to a reciprocal path oriented toward and away from said shunt position;

means for defining a first longitudinal slot in said shunt-positioning slide, said slot defined as being aligned with said reciprocal path and having spaced apart and opposed slot ends;

an actuator pin including one end rigidly secured to said actuator slide, a body portion adapted for passage through and reciprocal motion within said first longitudinal slot in said shunt-positioning slide, said actuator pin including a second end extending beyond said first longitudinal slot;

means attached to said second end of said actuator pin for resiliently biasing said actuator slide away from said shunt position;

said actuator slide being responsive to (a) an initial lessening in the tension in said medium when said magnetic shunt is disposed in said shunt position for enabling said biasing means to move said actuator pin and said actuator slide a predetermined distance away from said shunt position without imparting motion to said shunt-positioning slide, (b) a further lessening in the tension in said medium for enabling said biasing means to move said actuator pin and said actuator slide beyond said predetermined distance away from said shunt position for enabling said actuator pin to engage one slot end of said first longitudinal slot defined in said shunt-positioning slide and move said shunt-positioning slide and said shunt member away from said shunt position, (c) an initial increase in the tension in said medium when said shunt member is positioned away from said shunt position for enabling said actuator slide to overcome the force of said biasing means and move said actuator pin towards said shunt position without said actuator pin engaging the other slot end of said first longitudinal slot defined in said shunt-positioning slide, and (d) a further increase in the tension in said medium for moving said actuator pin a second predetermined distance with respect to said shunt-positioning slide for enabling said actuator pin to re-engage said shunt-positioning slide and move said shunt member toward said shunt position.

5. The improved tension control system of claim 4 further including:

a frame member, said frame member including means for defining a second longitudinal slot in said frame member, said second longitudinal slot being aligned along the axis of motion of said actuator slide and said shunt-positioning slide;

means for maintaining said frame member, said actuator slide, and said shunt-positioning slide in aligned relationship to one another; and tension responsive roller means, including a roller support shaft extending through said second longitudinal slot for reciprocal motion therein, said actuator slide secured to said roller support shaft for movement therewith; said tension responsive means further including a roller rotatably mounted on said roller support, said roller adapted to be responsive to the tension in said medium for reciprocally positioning said roller shaft within said second longitudinal slot.

6. The improved tension control system of claim 5 wherein said actuator slide includes means for defining a third longitudinal slot therein, said third longitudinal slot being aligned along the axis of motion of said shunt-positioning slide;

wherein said shunt-positioning slide includes a fourth longitudinal slot, said fourth longitudinal slot being aligned along the axis of motion of said shunt-positioning slide;

wherein said means for limiting the motion of said actuator slide includes guide pin means, said guide pin means including a first end secured to said frame member, a body portion extending through said third longitudinal slot in said actuator slide and through said fourth longitudinal slot in said shunt-positioning slide.

7. The improved tension control system of claim 6 wherein said maintaining means further includes a clip means having one end attached to the second end of said guide pin means and a pair of spring-like arms extending therefrom, said spring-like arms being spaced apart from and parallel to one another and each of said spring-like portions including a tongue-like means extending therefrom for maintaining said actuator slide and said shunt-positioning slide in a slidable relationship to one another, the space between said spring-like members being adapted for receiving said actuator pin for longitudinal motion therein.

8. In a system wherein a ribbon-like member is unwound before being passed to a utilization station and subsequently rewound, said system including a means for supplying said ribbon-like member, take-up means for rewinding said ribbon-like member, a rewind motor means which may be operated to drive said take-up means, a source of magnetic flux, a reed switch means responsive to the presence of absence of said magnetic flux for controlling the operation of said rewind motor and a shunt member which is positionable into a shunt position disposed between said reed switch and said source of magnetic flux for diverting the magnetic flux and deactivating the reed switch, said shunt member being positionable away from said shunt position for activating said reed switch and operating said rewind motor to drive said take-up means to restore the tension in said ribbon-like member, the improvement comprising:
slide means;
shunt-positioning means;
means for constraining the motion of said slide member along a reciprocal path toward and away from said shunt position;
tension-responsive roller means disposed for engagement with said ribbon-like member and responsive to the tension therein for moving said slide means along said reciprocal path in response to the variations in the tension in said ribbon-like medium;
pin means rigidly attached to said slide means for motion therewith, said pin means being adapted for engaging or not engaging said shunt-positioning means;
biasing means coupled to said pin means for urging said pin means and said slide means away from said shunt position in a direction opposite to that in which the slide means is urged by the tension in said ribbon-like member, said biasing means operating to urge said slide means away from said reed switch when the tension in said ribbon-like member decreases; and
shunt-positioning means responsive to said pin means engaging said shunt-positioning means for positioning said shunt member in said shunt position indicative of a normal tension in said ribbon-like member for deactivating said reed switch and turning off said rewind motor, and said shunt-positioning means also being responsive to said pin means having moved to a predetermined position indicative of a substantial loss in the tension in said ribbon-like member for positioning said shunt member away from said shunt position and operating said rewind motor to increase the tension in said ribbon-like member, said shunt-positioning means including means responsive to less than a substantial variation in the tension in said ribbon-like member for disregarding the motion of said slide means for not engaging said shunt-positioning means by said pin means and maintaining the present position of said shunt-positioning means with respect to said shunt position.

9. The improved system of claim 8 wherein said shunt-positioning means comprises:
a slidable body member;
means at one end of said slidable body member for securing said shunt member thereto;
means for maintaining said slidable body member in a slidable relationship to said slide means; and
wherein said slidable body member includes means for defining a longitudinal opening for receiving said pin means such that said pin means is free to move within said opening when variations in tension cause said slide means to move toward and away from said reed switch without engaging and moving said slidable body member until the motion of said slide means has caused said pin means to contact one end or the other of said longitudinal slot such that further movement by said slide means toward the end of the longitudinal slot engaged by said pin means will cause said slidable body member to move in that direction and reposition said shunt member.

10. The system of claim 9 further including a second source of magnetic flux and a second reed switch positioned in proximity thereto, said second reed switch remaining operative in response to the generated magnetic flux for indicating normal system operation and being responsive to the absence of said generated magnetic flux for signalling a system error and wherein said slide means includes a second shunt member attached to the end of said slide means nearest said second reed switch, said slide means being responsive to a total lack of tension in said ribbon-like member for allowing said biasing means to move said slide means toward said second reed switch and position said second shunt member between said second source of magnetic flux and said second reed switch for preventing said second reed switch for receiving said generated magnetic flux.

11. A method for activating and deactivating a rewind motor which is used to operate a takeup roll to increase the tension in a rewindable medium, the activation and deactivation of said rewind motor being controlled by a magnetically actuated reed switch, said method comprising the steps of:
normally positioning a shunt plate at a shunt position in close proximity to said magnetically-actuated reed switch for deactivating said rewind motor when normal tension exists in said rewindable medium;
moving a first slidable member adapted for intermittent engagement of said shunt plate in response to a decrease of the tension in said rewindable medium in a direction away from said shunt position;
engaging said shunt plate by said first slidable member only after said first slidable member has been moved to a position a predetermined distance away from said shunt position, said predetermined distance corresponding to a predetermined substantial decrease of tension in said rewindable medum below said normal tension; and
continuing the movement of said first slidable member in response to a further substantial decrease of the tension in said rewindable medium while continuing the movement of the shunt plate only when engaged by said first slidable member during said continued movement away from said magnetically actuated reed switch until the shunt plate is removed from said shunt position in close proximity to said reed switch for actuating said switch and operating said rewind motor to restore the tension in said rewindable medium while also preventing undesirable recycling of the rewinding motor in response to a decrease of tension less than said substantial predetermined decrease of tension in said rewindable medium.

12. A tension-responsive switch apparatus comprising:
  a source of magnetic flux;
  switching means including a reed switch, said switching means being responsive to said magnetic flux for activating said reed switch;
  flux-diverting shunt means insertable between said source of magnetic flux and said switching means for diverting the magnetic flux and deactivating said reed switch;
  shunt-positioning means for positioning said shunt means with respect to said switching means, said shunt-positioning means being slidably mounted for motion toward and away from said switching means and said shunt-positioning means including means for defining a longitudinal slot having its axis aligned along the path of motion of said shunt-positioning means;
  slide means mounted in operable relationship to said shunt-positioning means for motion toward and away from said switching means, said slide means being reciprocally positionable between a first predetermined position and a second predetermined position;
  tension-sensing means being responsive to tension for urging said slide means toward said switching means, said tension-sensing means being responsive to normal tension for positioning said slide means in said first predetermined position and being responsive to a decrease in said tension for allowing said slide means to be positioned toward said second predetermined position;
  actuator pin means secured to said slide means and extending through the longitudinal slot of said shunt-positioning means for reciprocal movement within said slot; and
  biasing means coupled to said activator pin means for urging said slide means away from said switching means when said tension decreases below said desired normal tension, and wherein said biasing means is responsive to a predetermined amount of decrease in tension for causing said actuator pin means to engage the end of said longitudinal slot and re-position said shunt means away from between said source of magnetic flux and said reed switch;
  a frame member, said frame member including means for defining a second longitudinal slot in said frame member, said second longitudinal slot being aligned along the axis of motion of said slide means and said shunt-positioning means and being adapted to receive said tension sensing means for movement therein toward and away from said switching means; and
  means for positioning said frame member, said slide means and said shunt-positioning means in operative relation to one another.

13. The tension-responsive switch apparatus of claim 12 wherein said tension sensing means includes a shaft means including a body portion for positioning within said second longitudinal slot for motion therein, said shaft means further including means for attaching one end of said body portion to said slide means and said tension sensing means further including means attached to the other end of said body portion for sensing said tension and moving said shaft means within said second longitudinal slot toward and away from said switching means in response to variations in said tension.

14. The tension-responsive switch apparatus of claim 13 wherein said shunt-positioning means includes means for defining a third longitudinal guide slot; wherein said slide means includes means for defining a fourth longitudinal guide slot; wherein said positioning means includes a guide pin means having one end attached to said frame member and the other end passing through said third and fourth guide slots for confining the motion of said slide means and said shunt-positioning means along a path toward and away from said switching means; and wherein said biasing means includes a coil spring.

15. A switch actuating apparatus wherein a flux-diverting shunt may be positioned between a source of magnetic flux and a magnetic flux-actuated switching means for diverting the magnetic flux and deactuating the switching means, said switch-actuating apparatus comprising:
  slide means slidably mounted for reciprocal motion toward and away from said switching means;
  means for sensing external force and directly responsive thereto for moving said slide means toward said switching means in response to an increase in said external force and for allowing said slide means to move away from said switching means in response to a decrease in said force;
  actuator pin means mounted on said slide means for reciprocal motion therewith;
  means for biasing said actuator pin means and urging said slide means away from said switching means for moving said slide means away from said switching means when said force decreases; and
  shunt-positioning means for positioning said flux-diverting shunt with respect to said switching means, said shunt-positioning means including a means for establishing a predetermined range in which the motion of said actuator pin means with respect to said shunt will not change the position of said shunt with respect to said switching means and beyond which said actuator pin means will engage said shunt-positioning means and impart motion thereto so as to re-position said shunt with respect to said switching means.

16. The switch actuator apparatus of claim 15 wherein said means for establishing a predetermined range includes a means for defining a longitudinal slot aligned along the axis of reciprocal motion of said slide means toward and away from said switching means and wherein said actuator pin means is positionable by said slide means in response to a predetermined normal force for engaging the end of said slot nearest said switching means and moving said shunt-positioning means to position said flux-diverting shunt between said source of magnetic flux and said switching means so as to deactivate said switching means, wherein said actuator pin means may be moved away from said switching means as said slide means responds to a decrease in said force until said actuator pin means engages the opposite end of said slot without moving said shunt-positioning means, wherein the further motion of said actuator pin means away from said switching means in response to a further decrease in force causes said pin means to engage the opposite end of said slot and move said shunt-positioning means away from said switching means until said flux-diverting shunt is no longer positioned between said source of magnetic flux and said switching means thereby causing said switching means to be actuated by said magnetic flux, and wherein said actuator pin means is free to move with said slide means up and down the length of the slot in response to minor variations in the sensed force without moving the shunt-positioning means regardless of the relative positions of said slide means and said shunt-positioning means.

* * * * *